April 14, 1931.  F. PORSCHE  1,801,174
VACUUM BRAKE OF MOTOR VEHICLES
Filed Nov. 1, 1928
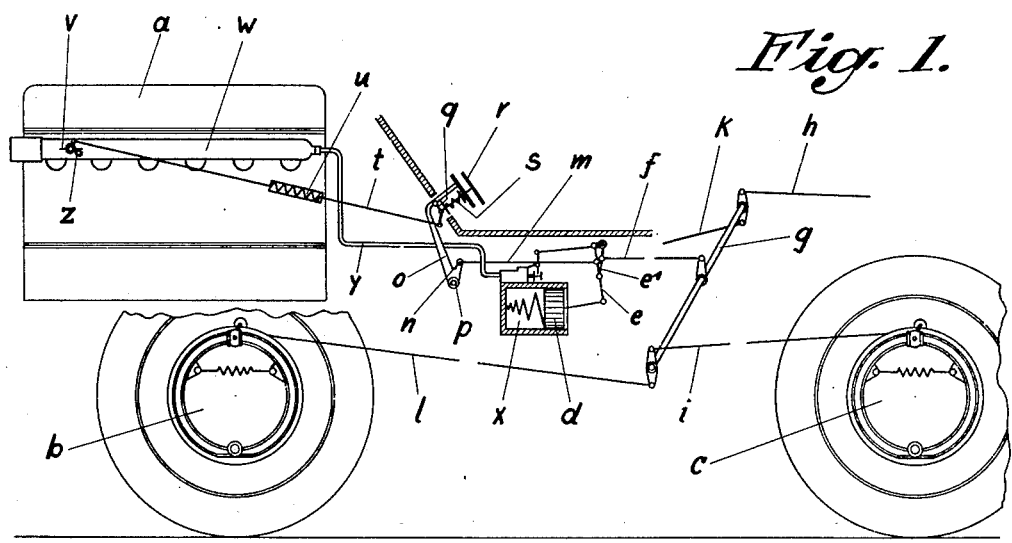
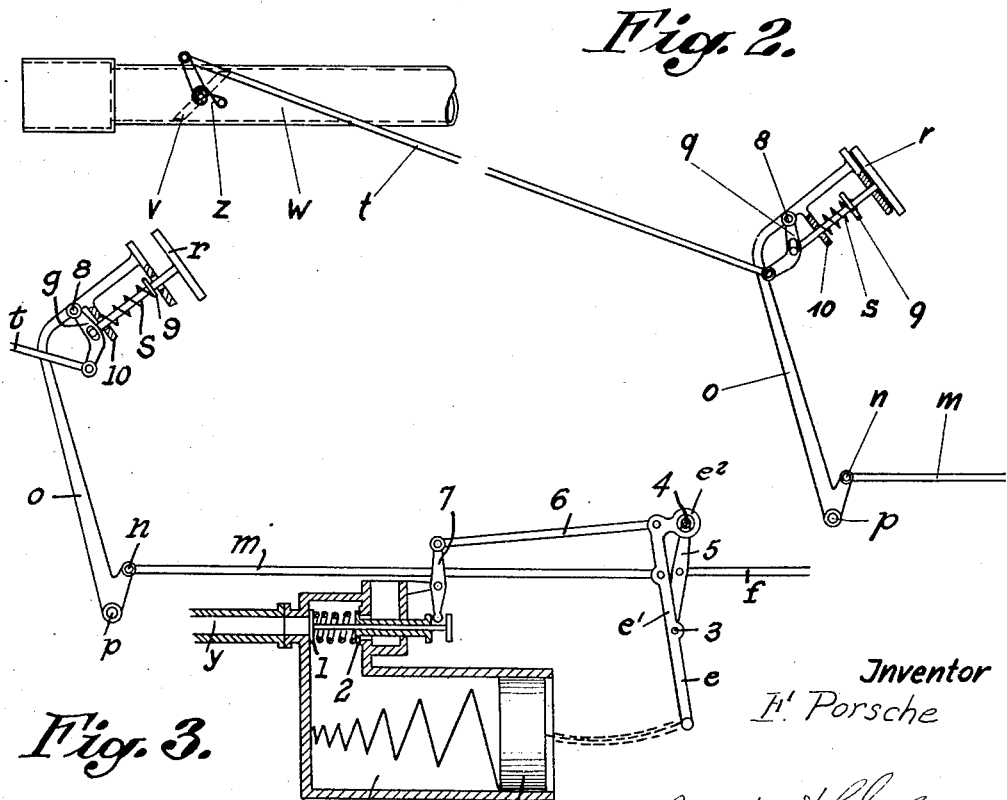
Inventor
F. Porsche
By Marks & Clerk
Attys.

Patented Apr. 14, 1931

1,801,174

UNITED STATES PATENT OFFICE

FERDINAND PORSCHE, OF STUTTGART-UNTERTURKHEIM, GERMANY, ASSIGNOR TO DAIMLER-BENZ AKTIENGESELLSCHAFT, OF BERLIN, GERMANY, A GERMAN COMPANY

VACUUM BRAKE FOR MOTOR VEHICLES

Application filed November 1, 1928, Serial No. 316,482, and in Germany October 19, 1927.

This invention relates to vacuum brakes for motor vehicles provided with driving engines working on the Diesel system, the cylinders of the Diesel engine being employed for producing the vacuum required for braking the vehicle.

The invention consists in this that for this purpose a throttle valve is fitted in the air induction pipe. In the case of Diesel engines, such a valve is not usually fitted at this point for this purpose. The portion of the air induction pipe which is shut off by the throttle valve is then connected up to the evacuating member of the brake cylinder by means of a pipe. For actuating the throttle valve, an actuating mechanism is arranged on the dashboard, which is connected up by means of rods to the throttle valve. In order to obtain an intensive application of the brakes without any hesitation immediately they are put on, the whole system is evacuated before the brakes are applied. For this purpose, the mechanism for actuating the throttle valve and that for actuating the brakes are interconnected in such a manner that they can only be put into operation in a certain predetermined sequence. Only when a feeler member connected up to the throttle valve in the induction pipe is depressed can the brake lever be actuated, the two actuating members then moving in unison. As the throttle valve in the induction pipe has already arrived in its closing position, a yielding member is interposed. The spindle of the throttle valve is acted on by a spring which maintains the throttle valve in its open position.

A constructional form of the invention is illustrated by way of example in the accompanying drawing.

Figure 1 shows a longitudinal elevation, partly in section of the complete arrangement of the brakes with the Diesel engine and two road wheels on one side of a vehicle with the brakes, the brake cylinder being shown in section.

Figure 2 shows on a somewhat larger scale the brake cylinder and the induction pipe of the Diesel engine.

Figure 3 shows on a still larger scale the brake cylinder and the rods directly connected up to it.

Referring to the drawing, the engine $a$ serves for driving the vehicle which is not illustrated in detail. The brakes $b$ and $c$ inserted in the front and rear wheels of the vehicle are applied by a vacuum. For this purpose, the piston $d$ is connected up by means of the lever $e$, $e'$ connected by the rod $m$ to the pedal $o$, the lever 5 and the pull rod $f$ to the shaft $g$, which for example is common to the front and rear wheels, said shaft actuating the individual brakes through the pull rods $h$, $i$, and $k$, $l$. The lever 5 is articulated to the lever $e$, $e'$ at the point 3 and has a fixed fulcrum at the point 4 comprising a bearing member which surrounds the eye $e^2$ of the lever $e$, $e'$ with a very considerable amount of clearance.

If, by depressing the pedal $o$, the pull rod $m$ is drawn to the left, then the lever $e$, $e'$ is rocked about the point 3, the eye $e^2$ bears against the fixed fulcrum 4 and through the intermediary of the rod 6 and the two-armed lever 7 the valve 1 is opened while the valve 2 remains closed. The brake cylinder $x$ is now under the suction action of the engine, the piston $d$ is moved to the left and the lever $e$, $e'$ is rocked about the fixed fulcrum 4. By this means the rod $f$ is pushed to the left and the brakes are applied.

The rod $m$ is articulated to the pedal $o$ at $n$, the pedal rocking about the pedal shaft $p$. To the pedal is articulated a lever $q$ which is pivoted to the lever $o$ at the point 8. Connected to the feeler $r$ is a plate 9 against which bears a spring $s$, the other end of the spring $s$ bearing against a portion 10 of the pedal. By means of a rod $t$, in which for example a spring $u$ is interposed, the lever $q$ is connected to the throttle valve $v$ in the air induction pipe $w$, a spring $z$ acting on the said valve.

A pipe $y$ is connected up to the air intake pipe $w$, said pipe being in open communication with the cylinder $x$ of the piston $d$. In the connection of the pipe $y$ to the cylinder $x$ is fitted a valve combination. The valve $l$ of this combination controls communication between the cylinder $x$ and the pipes $y$ and $w$ and the valve 2 controls communication between the cylinder $x$ and the outer air.

If the vacuum brake for any reason refuses to act, then the driver can without further ado apply the brakes by depressing the pedal with the full force of his body. In this case, first of all the eye $e^2$ bears against the stud 4 and in the further depression of the pedal, the levers $e$, $e'$ and 5 rock in unison about the fulcrum 4 and thereby draw on the brakes through the intermediary of the pull rod $f$.

Figure 1 shows the brakes in the "off" position, the throttle valve $v$ in the pipe $w$ being open. In Figure 2, the throttle valve is closed, the braking mechanism, however, being likewise in the inoperative position.

It is to be noted that after the movement of the valve $v$ into the position shown in Figure 2, the air supply to the suction pipe to the cylinders behind the throttle valve is more or less considerably throttled, while the cylinders connected up to the suction pipe in front of the throttle valve (in the drawing the extreme left-hand cylinder) receive a full charge of air. Thus, the motor continues to operate under the action of that section of the cylinders which operates under full power, the engine output being reduced by the throttled cylinders. As, when the brakes are applied, no work is required to be performed by the engine, this state of affairs satisfies practical requirements. Limitation to complete cut-off of the air supply is not intended but on the contrary, the invention is only concerned with throttling of the air supply, which of course includes a complete or almost complete closure of the suction pipe.

Figure 3 shows the brake cylinder in the inoperative position with the brakes in the "off" position.

When the feeler $r$ is depressed into the position shown in Figure 2 the cross section of the pipe $w$ is throttled. By this means the air is to a large extent sucked out of the pipe $w$ and the pipe $y$ communicating with it, if the brake lever $q$ is thereupon depressed, when the valve $l$ is opened and the vacuum existing in the pipes $w$ and $y$ causes the immediate exhaustion of the cylinder $x$. By this means the brakes $b$ and $c$ are applied intensively without any hesitation. When the pressure on the pedal $o$ is relinquished, the valve 1 closes while the valve 2 is opened and the outer air can pass into the cylinder $x$.

What I claim is:—

1. In a power driven vehicle having a Diesel engine as driving motor, an air-suction pipe for the motor, a throttle member in this suction pipe, a pedal on the dash board connected to the throttle member and a second pedal for performing another function and which is connected to the first pedal and through the tread of which the first-mentioned pedal is passed.

2. In a power driven vehicle having a Diesel engine as driving motor, an air suction pipe for the motor, a throttle member in this suction pipe, a braking member adapted to be actuated by vacuum, a valve mechanism controlling the braking member, a pipe between the suction pipe and the valve mechanism, a pedal for actuating the throttle member, a pedal for actuating the valve mechanism which is connected to the first pedal and through which the first pedal passes.

3. In a power driven vehicle having a Diesel engine as driving motor, an air suction pipe for the motor, a throttle member in this suction pipe, a spring holding the throttle member in the open position, a brake member adapted to be actuated by vacuum, a valve mechanism controlling the brake member, a connecting pipe between the suction pipe and the valve mechanism, a pedal for actuating the throttle member, a second pedal for actuating the valve mechanism, both pedals being connected to one another in such a manner that first of all the first-mentioned pedal is depressed, thereupon comes into operative contact with the second pedal and both are then moved further in unison, the throttle member being moved into the throttling position against the action of the spring holding it back.

In testimony whereof I have affixed my signature.

FERDINAND PORSCHE.